United States Patent
Wilson et al.

(10) Patent No.: US 9,081,797 B2
(45) Date of Patent: Jul. 14, 2015

(54) SYSTEMS AND METHODS FOR ASSOCIATING MICROPOSTS WITH GEOGRAPHIC LOCATIONS

(71) Applicant: GOOGLE Inc., Mountain View, CA (US)

(72) Inventors: Marc Peter Tarca Wilson, London (GB); Fiona Elizabeth Herring, London (GB)

(73) Assignee: GOOGLE INC., Mountain View, CA (US)

( * ) Notice: Subject to any disclaimer, the term of this patent is extended or adjusted under 35 U.S.C. 154(b) by 122 days.

(21) Appl. No.: 13/787,045

(22) Filed: Mar. 6, 2013

(65) Prior Publication Data
US 2014/0258280 A1 Sep. 11, 2014

(51) Int. Cl.
*G06F 17/30* (2006.01)

(52) U.S. Cl.
CPC ...... *G06F 17/30241* (2013.01); *G06F 17/3087* (2013.01); *G06F 17/30705* (2013.01)

(58) Field of Classification Search
CPC ................. G06F 21/577; G06F 3/0482; G06F 17/30241; G06F 17/30705; G06F 17/30985; G06F 21/566
USPC ......... 707/724, 723, 737, 740, 741, 748, 749, 707/754, 790
See application file for complete search history.

(56) References Cited

U.S. PATENT DOCUMENTS

| | | | |
|---|---|---|---|
| 8,478,701 B2* | 7/2013 | Murdock et al. | 706/12 |
| 8,510,348 B2* | 8/2013 | Hancock | 707/803 |
| 8,566,309 B2* | 10/2013 | Jennings | 707/723 |
| 8,595,317 B1* | 11/2013 | Harris et al. | 709/213 |
| 8,631,084 B2* | 1/2014 | Garcia | 709/207 |
| 8,650,198 B2* | 2/2014 | Moitra et al. | 707/749 |
| 8,719,302 B2* | 5/2014 | Bailey et al. | 707/790 |
| 2010/0114881 A1 | 5/2010 | Christian et al. | |
| 2010/0185519 A1 | 7/2010 | Ramaswany | |
| 2011/0029474 A1 | 2/2011 | Lin | |
| 2012/0041953 A1 | 2/2012 | Dumais et al. | |
| 2012/0109942 A1 | 5/2012 | Epshtein et al. | |
| 2012/0158863 A1 | 6/2012 | Kikin-gil et al. | |
| 2012/0166367 A1 | 6/2012 | Murdock et al. | |
| 2012/0191512 A1 | 7/2012 | Wuoti et al. | |
| 2012/0219191 A1 | 8/2012 | Benzarti et al. | |
| 2012/0265806 A1 | 10/2012 | Blanchflower et al. | |
| 2012/0278395 A1 | 11/2012 | Garcia | |
| 2013/0018968 A1 | 1/2013 | Pennacchiotti et al. | |

(Continued)

OTHER PUBLICATIONS

International Search Report & Written Opinion for PCT App. No. PCT/US2014/019491, mailed Sep. 5, 2014. (pp. 1-10).
DBSCAN, From Wikipedia, the free encyclopedia, <en.wikipedia.org/wiki/DBSCAN>, Dec. 14, 2012, pp. 1-5, US.

(Continued)

*Primary Examiner* — Jay Morrison
*Assistant Examiner* — Dangelino Gortayo
(74) *Attorney, Agent, or Firm* — Marshall, Gerstein & Borun LLP (57) ABSTRACT

Embodiments include a computer-implemented method that includes receiving microposts including tokens, identifying a subset of the microposts that include a given token, determining a geographic location corresponding to the subset of the microposts that include the given token, associating the given token with the geographic location, and updating an index to reflect an association between the given token and the geographic location.

21 Claims, 4 Drawing Sheets

(56) References Cited

U.S. PATENT DOCUMENTS

2013/0086072 A1* 4/2013 Peng et al. .................... 707/743
2014/0143346 A1* 5/2014 Mahmud et al. .............. 709/206

OTHER PUBLICATIONS

Microblogging, From Wikipedia, the free encyclopedia, <en.wikipedia.org/wiki/Microblogging>, Oct. 15, 2012, pp. 1-6, US.

* cited by examiner

SYSTEMS AND METHODS FOR ASSOCIATING MICROPOSTS WITH GEOGRAPHIC LOCATIONS

BACKGROUND OF THE INVENTION

1. Field of the Invention

Embodiments of this invention relate generally to microblogging and, more particularly, to special purpose machines, systems, methods and computer instructions for associating microposts with geographic locations.

2. Description of the Related Art

Microblog services provide a broadcast medium that enables users to exchange small elements of content in the form of microposts that include short sentences, messages, video links, or the like. For example, services, such as Twitter, enable users to broadcast short messages called "Tweets" (e.g., up to 140 characters in length) to other users that have expressed an interest in receiving content generated by the user. As a further example, social networking sites, such as Google+, allow users to provide short status updates that are published for viewing by other users on the social network.

In some instances, users include certain tokens in their microposts. Such tokens may include words, phrases, symbols or the like that are intended to associate the micropost with a given thing (e.g., an entity, location, event, subject, or the like). For example, a micropost may include a hashtag (denoted by a "#" followed by keyword or phrase) that is associated with a given entity, location, event, or the like. A user may, for example, include the hashtag "#qpr" within a micropost to associate the micropost with the Queens Park Rangers soccer team. Such tokens may enable simplified categorizing of microposts. For example, a user may simply click a hashtag of a micropost to access other microposts that include the same hashtag.

Although microblog services provide for the exchange of short elements of information, they may only provide a limited amount of information about users, locations, events or the like associated with the microposts. For example, although a user may be able to quickly access a large number of microposts about an event by simply clicking on a hashtag, they may not be able to decipher a location of the event based on the content of the microposts. Moreover, users generating microposts may not be aware of tokens that are related to their microposts and, thus may not make use of them. As a result, a user's micropost may not be categorized with related microposts due to the fact it does not contain a corresponding token.

SUMMARY OF THE INVENTION

Various embodiments of methods and apparatus for associating microblog messages with geographic locations are provided herein. In some embodiments, provided is a computer-implemented method that includes receiving microposts including tokens, identifying a subset of the microposts that include a given token, determining a geographic location corresponding to the subset of the microposts that include the given token, associating the given token with the geographic location, and updating an index to reflect an association between the given token and the geographic location.

In some embodiments, provided is a non-transitory computer readable medium having program instructions stored thereon that are executable by a processor to cause the following steps: receiving microposts including tokens, identifying a subset of the microposts that include a given token, determining a geographic location corresponding to the subset of the microposts that include the given token, associating the given token with the geographic location, and updating an index to reflect an association between the given token and the geographic location.

In some embodiments, provided is a system including one or more memories storing instructions, and one or more processors coupled to the one or more memories and configured to execute the instructions stored thereon to perform the following steps: receiving microposts including tokens, identifying a subset of the microposts that include a given token, determining a geographic location corresponding to the subset of the microposts that include the given token, associating the given token with the geographic location, and updating an index to reflect an association between the given token and the geographic location.

DETAILED DESCRIPTION

As discussed in more detail below, provided are systems and methods for associating microposts with geographic locations based at least in part on location information provided in association with microposts.

As used herein, a "micropost" may refer to content posted via a microblog service. A micropost may include, for example, short messages (e.g., a "Tweet", a social network status update, or the like) that is generated by an entity (e.g., a user, business or the like), and is broadcast to other entities (e.g., followers, subscribers, friends, or the like) that have expressed an interest in receiving content generated by the entity. In some embodiments, a micropost may include a limited amount of content (e.g., up to about 150 characters).

In some instances, a micropost may be associated with one or more tokens. A token may be contained in, or otherwise associated with, the micropost that is intended to associate the micropost with a given thing (e.g., an entity, location, event, subject, or the like). In some embodiments, a token may include a hashtag denoted by a "#" followed by keyword or phrase that is intended to associate the micropost with a particular thing. For example, a micropost may include the hashtag "#qpr" (which is associated with the Queens Park Rangers soccer team) to associate the micropost with the Queens Park Rangers soccer team. Microposts that include, or are otherwise associated with, a similar hashtag may be categorized together. In some instances, a user may simply click a hashtag in a micropost to access other microposts in the same category (e.g., that include the same hashtag).

In some instances, a micropost may be associated with geographic location ("geolocation") information. For example, a micropost that is generated using an electronic device, such as a cellular phone, may be "geo-tagged" with information indicative of a geolocation of the electronic device at or near a time of generating the micropost. Geo-tagging a micropost may include adding geolocation metadata (e.g., geographic coordinates) to the micropost or otherwise associating geolocation metadata with the micropost. For example, a geo-tagged micropost generated using a mobile phone may include the micropost content and a geo-tag that includes geographic coordinates indicative of a geolocation of the mobile phone at or near a time the micropost is generated by the user.

In some embodiments, geolocation information associated with microposts is used to identify one or more geolocations to be associated with a micropost token. For example, if a large number of microposts are generated that include the hashtag "#qpr" and that are geo-tagged with location information corresponding to Loftus Road Stadium in London, the hashtag "#qpr" may be associated with the geolocation of Loftus Road Stadium.

In some embodiments, a geolocation identified as being associated with a given token is used to provide suggested tokens to be associated with a micropost. For example, where a user is generating a micropost while standing near Loftus Road Stadium, the user's proximity to Loftus Road Stadium may be identified, and the user may be prompted with the suggested hashtag "#qpr". Such suggested tokens may apprise users of tokens that they are not aware of and/or may enable a user to add a hashtag to a micropost quickly and easily.

In some embodiments, an entity associated with a given token is associated with the identified geolocation. For example, where the hashtag "#qpr" is associated with a soccer match that is played by the Queens Park Rangers soccer team, the soccer match is associated with the geolocation of Loftus Road Stadium. Such an association can be used to extract location information for an event that may otherwise be unavailable. For example, where a soccer match played by the Queens Park Rangers soccer team is not publicized, a geolocation for the match can be identified based at least in part on geolocation information obtained in association with microposts that include the hashtag "#qpr".

In some embodiments, the location of a user can be identified based at least in part on their submission of a micropost that includes a given token and the given token being associated with a location. For example, where the hashtag "#qpr" is associated with the location of Loftus Road Stadium, a user that generates a micropost that includes the hashtag "#qpr" may be associated with the location of Loftus Road Stadium. Such an association can be used to determine a location of the user. Such information can be used in the context of personalizing search results.

Figure 1:
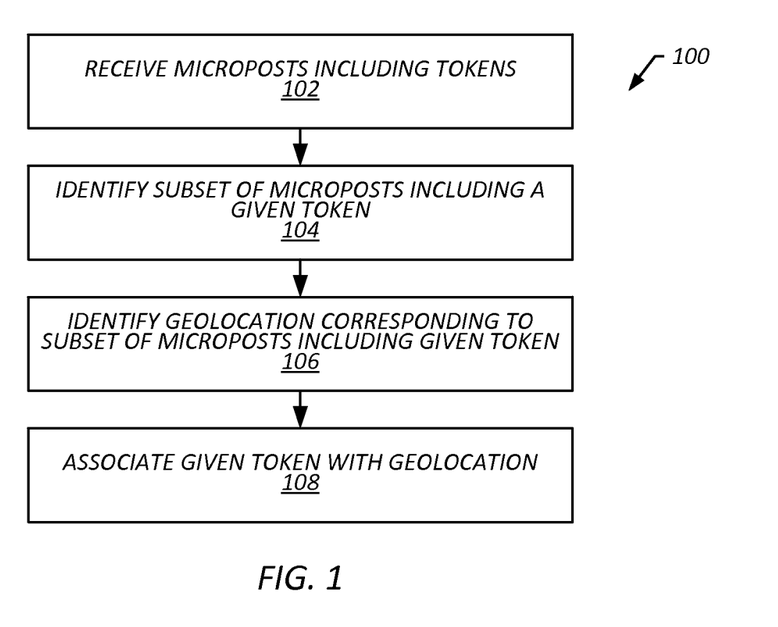
FIG. 1 is a flowchart that illustrates a method of associating a microblog token with a geographic location in accordance with one or more embodiments of the present invention.

FIG. 1 is a flowchart that illustrates a method 100 of associating a microblog token with a geolocation in accordance with one or more embodiments of the present invention. Method 100 may generally include receiving microposts that include microblog tokens, identifying a subset of the received microposts that include a given microblog token, identifying a geolocation corresponding to the subset of microposts, and associating the given microblog token with the geolocation identified.

Method 100 may include receiving microposts that include microblog tokens ("tokens"), as depicted block 102. In some embodiments, receiving microposts that include tokens includes receiving one or more microposts from one or more users. For example, a microblog server (e.g., microblog server 602) may receive microposts generated by any number of users via microblog applications executing on their respective electronic devices (e.g., mobile phones, mobile computers, desktop computers, or the like). The submitted microposts may be received and collected by the microblog server. For example, the microblog server may store a log of the received microposts in a database. In some embodiments, at least some of the microposts received include microblog tokens associated therewith. For example, at least some of the microposts generated by the users may include one more hashtags embedded in the content of the micropost.

Figure 2:
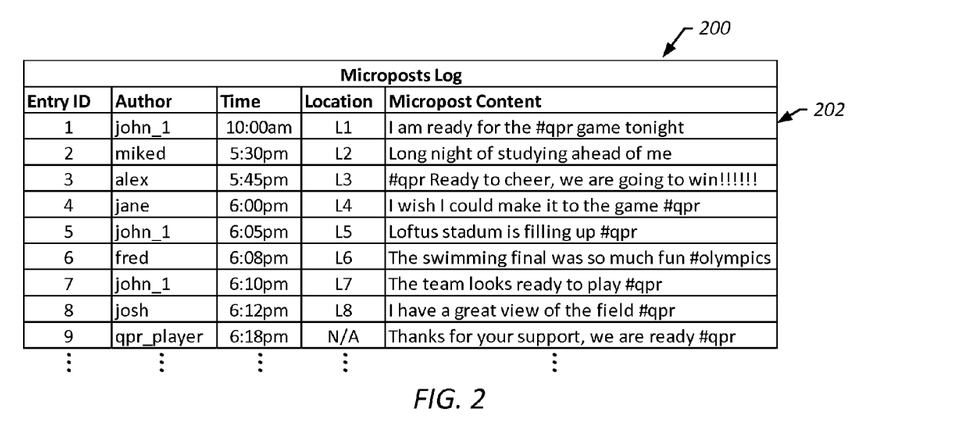
FIG. 2 is a table that illustrates a log of received microposts in accordance with one or more embodiments of the present invention.

FIG. 2 is a table that illustrates a log 200 of received microposts 202 in accordance with one or more embodiments of the present invention. The illustrated portion of index 200 includes nine microposts 202 that each includes an identifier, an author, a time, a location (if available) and corresponding micropost content. The identifier may uniquely identify the respective micropost relative to the other microposts of log 200. The author may include an identifier that is indicative of the entity that generated the corresponding micropost. For example, the author may include a user name (e.g., a screen name) that is associated with a microblog account used to generate the corresponding micropost. Time may include a timestamp that is indicative of a time when the corresponding micropost was generated. In some embodiments, the author's consent is required to use the author's location information to geotag the micropost. In some embodiments, the author's consent is required to store information linking the author to a particular time and location corresponding to the micropost, or to share that information with other users. In some implementations, log 200 may only store the micropost identifier, the time and the location of the micropost.

The location may be indicative of a location from which the corresponding micropost is generated. In some embodiments, the location may be derived from geolocation data provided in association with the corresponding micropost. For example, where a user submits a micropost from a mobile electronic device having a global positioning (GPS) device integrated therein, using the GPS device, the mobile electronic device may determine its geographic coordinates at or near the time of the user generating the micropost, and may geo-tag the micropost with geolocation metadata that includes the geographic coordinates. In some embodiments, upon receipt of the geo-tagged micropost form the electronic device, the microblog server determines the corresponding location based at least in part on the geolocation metadata. Although some embodiments include deriving the location information based on geolocation metadata provided by an electronic device used to generate the micropost, any suitable locating techniques may be employed to determine the location information. For example, the location of the electronic device at or near the time of generating the micropost may be derived using triangulation locating techniques, using internet-protocol (IP) locating techniques (e.g., IP lookup tables), and/or the like. Although the illustrated locations are denoted as "LN" for illustrative purposes, each of the denoted locations may be representative of any variety of location data, such as geographic coordinates (e.g., latitude and longitude coordinates). In some embodiments, location information is available for some microposts, whereas location information may not be available for other microposts. For example, in the illustrated embodiment, location information has been identified for each of the first eight microposts (e.g., microposts 1-8), whereas location information has not been identified for the ninth micropost (e.g., micropost 9).

The micropost content may include the text string of the corresponding micropost. As illustrated, at least some of the microposts may have one or more tokens (e.g., hashtags) embedded within their content, whereas other microposts do not. For example, each of the microposts 1 and 3-9 have a hashtag (e.g., "#qpr" or "#olympics") embedded within their content, whereas the micropost 2 does not.

Method 100 may include identifying a subset of microposts that include a given microblog token, as depicted at block 104. In some embodiments, identifying a subset of microposts that include a given microblog token includes identifying a given token and filtering the received micropost to identify a subset of the received microposts that each include or are otherwise associated with the given token. For example, the microblog server may identify the hashtag "#qpr" as a token of interest, and identify a subset of micropost of log 200 that have the substring "#qpr" embedded within their content. In some embodiments, the subset of microposts is limited to microposts that occur within a given period of time. For example, the subset may include only microposts that have time stamps indicative of them being generated within the last two hours. It will be appreciated that a timeframe of two hours is provided for illustrative purposes, although any suitable timeframe may be used (e.g., ten minutes, thirty minutes, one hour, five hours, twenty-four hours, week, and so forth).

Figure 3:
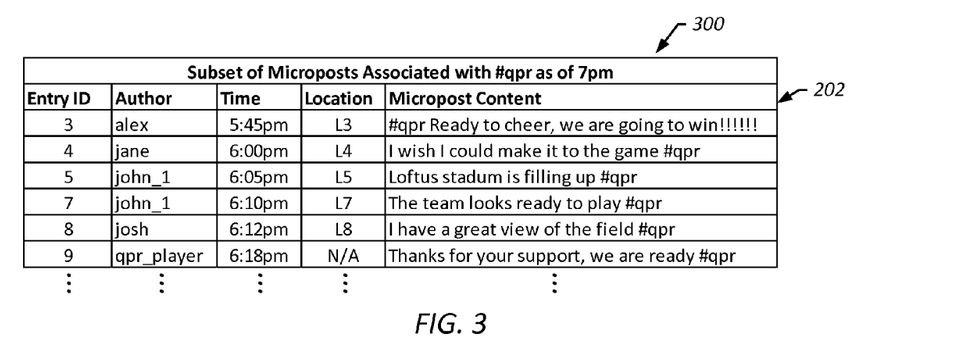
FIG. 3 is a table that illustrates a subset of microposts associated with a token in accordance with one or more embodiments of the present invention.

FIG. 3 is a table that illustrates a subset 300 of microposts associated with the hashtag "#qpr" in accordance with one or more embodiments of the present invention. As depicted, subset 300 includes microposts 202 submitted in the last two hours that have the substring "#qpr" embedded within their content, and excludes micropost entries 202 that were generated more than two hours prior or do not have the substring "#qpr" embedded within their content. For example, each of the micropost 1 (which was has a time that indicates it was generated more than two hours prior), the micropost 2 (which does not include a hashtag), and the micropost 6 (which includes the hashtag "#olymipics", but does not include the hashtag "#qpr") are excluded from subset 300. Although subset 300 includes six microposts for illustrative purposes, it will be appreciated that a subset can include any number of microposts that satisfy the filtering criteria (e.g., that are associated with the token of interest and generated in the specified timeframe).

Method 100 may include identifying one or more geolocations corresponding to the subset of microposts including the given token, as depicted at block 106. In some embodiments, identifying one or more geolocations corresponding to the subset of microposts is based at least in part on the location information associated with the subset of microposts. For example, one or more geolocations may be identified for the subset 300 based at least in part on locations L1-L5, L7, L8 and so forth. In some embodiments, the one or more locations are identified using a clustering technique. For example, a dbscan, or similar, clustering algorithm can be used to identify one or more cluster locations based on the locations L1-L5, L7, L8 and so forth. In some embodiments, a location may not be identified as a result of the assessment. For example, where the locations L1-L5, L7, L8 and so forth are wide spread and do not have an identifiable density in a given location, the clustering algorithm may not identify a location to be associated with subset 300. In some embodiments, a single location may be identified as a result of the assessment. For example, where the locations L1-L5, L7, L8 and so forth have an identifiable density about in a single location, the clustering algorithm may identify the single location for association with subset 300. Such a single location may be identified, for example, where an event, such as a soccer match, has a single venue. For example, where L1-L5, L7, L8 and so forth have an identifiable density about the location of "Loftus Road Stadium" (where the Queens Park Rangers play their soccer matches), application of a clustering algorithm may identify a location "L9" that corresponds to the geolocation of Loftus Road Stadium. In some embodiments, multiple locations may be identified as a result of the assessment. For example, where the locations L1-L5, L7, L8 and so forth are have an identifiable density about two or more locations, the clustering algorithm may identify the two or more locations for association with subset 300. Multiple locations may be identified, for example, where an event, such as the Olympic Games, has multiple venues. For example, where L1-L5, L7, L8 and so forth have an identifiable density about the location of an Olympic swimming facility, and the location of an Olympic track and field facility, application of a clustering algorithm may identify a location "L10" that corresponds to the geolocation of the Olympic swimming facility and a location "L11" that corresponds to the geolocation of the Olympic track and field facility.

In some embodiments, the step of identifying one or more geolocations corresponding to a subset of microposts including the given token may only be completed where the subset meets one or more threshold criteria. For example, the step of identifying one or more geolocations corresponding to the subset of microposts including the given token may be taken if some or all of the following conditions are met: (1) the subset of microposts includes at least a threshold number of microposts (n); (2) the subset of microposts includes at least a threshold number of microposts that include location information (p); and (3) the subset of microposts includes at least a threshold number of unique authors (q). The illustrated subset 300 includes at least six microposts (e.g., microposts 3-5 and 7-9), at least five unique authors (e.g., alex, jane, john__1, josh, and qpr_player), and at least five micropost having location information (e.g., L3, L4, L5, L7 and L8). Thus, for example, where the threshold criteria for proceeding with identifying a location requires the following: (1) the subset of microposts includes at least five microposts (n=5); (2) the subset of microposts includes at least four microposts (p=4) that include location information; and (3) the subset of microposts includes at least three unique authors (q=3), subset 300 may meet the threshold criteria, and the subset may be assessed as discussed above (e.g., via application of a clustering algorithm) in an attempt to identify one or more geolocations corresponding to subset 300. It will be appreciated that the exemplary threshold criteria is provided for illustrative purposes, and may include any suitable values and combinations of criteria. For example, another exemplary set of threshold criteria may include n=20, p=5, and q=5.

Method 100 may include associating the given token with the one or more geolocations identified, as depicted at block 108. In some embodiments, associating the given token with the one or more geolocations identified includes updating an index to reflect the identified association between the given token of interest and the one or more geolocations identified. For example, where the geographic location L9 is identified based at least in part on subset 300 which includes of microposts associated with the hashtag "#qpr", a token location index may be updated to reflect the association between the hashtag "#qpr" and the location L9.

Figure 4:
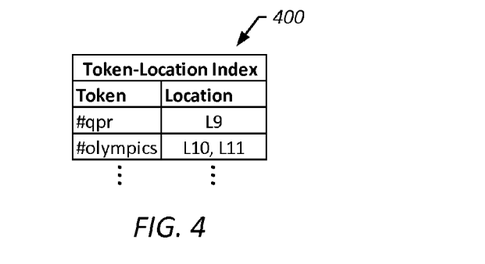
FIG. 4 is a table that illustrates a token-location index in accordance with one or more embodiments of the present invention.

FIG. 4 is a table that illustrates a token-location index 400 in accordance with one or more embodiments of the present invention. As depicted, a first entry of index 400 reflects an association between the hashtag "#qpr" and the location L9. As noted above, the location L9 may correspond to the geolocation of Loftus Road Stadium in London. Further, a second entry of index 400 reflects an association between the hashtag "#olympic" and the locations L10 and L11. As noted above, the location L10 and L11 may correspond to the geolocations of an Olympic swimming facility and an Olympic track and field facility, respectively. Index 400 may be stored (e.g., in a database 610 of a microblog server 602) for reference.

Figure 5:
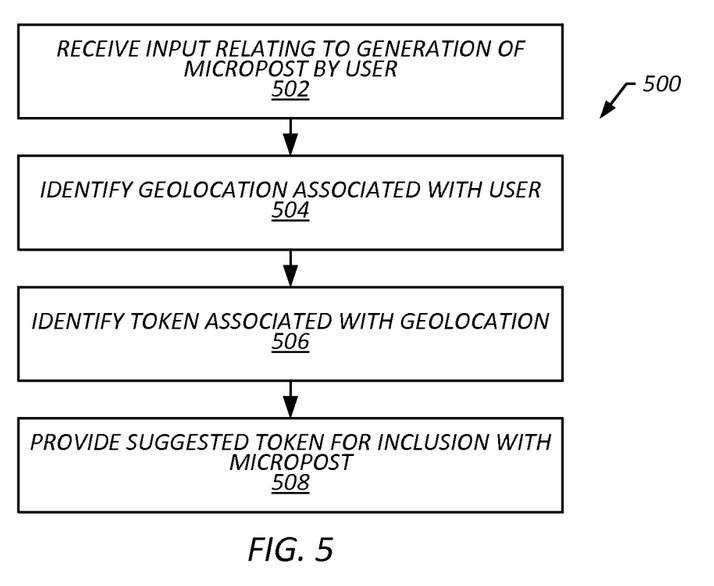
FIG. 5 is a flowchart that illustrates a method of providing a suggested token to be included in a micropost in accordance with one or more embodiments of the present invention.

The relationships identified between microblog tokens and geolocations may be used in a variety of manners. For example, while generating a micropost, a user may be provided with one or more suggested tokens associated with locations that are near the current location of the user. FIG. 5 is a flowchart that illustrates a method 500 of suggesting a token to be included in a micropost in accordance with one or more embodiments of the present invention. Method 500 may include receiving user input relating to generation of a micropost, as depicted at block 502. For example, a user may open a microblog application on a mobile device and select an option to generate a micropost, or even begin to enter content of a micropost in an input field of the microblog application. The user input, or at least an indication of the user input, may be relayed to the microblog server. The microblog server may, then, identify a location associated with the user, as depicted at block 504. In some embodiments, the location of the user may be determined using any suitable techniques, such as assessment of geolocation metadata (e.g., geo-tag data), triangulation locating techniques, internet-protocol (IP) locating techniques (e.g., IP lookup tables), and/or the like. For example, where the user input data is geo-tagged such that it includes the location L12, the microblog server may identify the geolocation L12 as the location of the user.

Method 500 may include identifying a token associated with the identified geolocation, as depicted at block 506. In some embodiments, identifying a token associated with the identified geolocation includes identifying one or more tokens that are associated with a location that is proximate to the identified location of the user. For example, the microblog server may assess token-location index 400 to identify tokens corresponding to locations that fall within a threshold distance of the identified location L12. Referring to the token location index of FIG. 4, where a threshold distance of one kilometer is specified, and location L12 is within one kilometer of location L9, the hashtag "#qpr" may be identified as a token associated with the identified location. As a further example, where a threshold distance of two kilometers is specified, the location L12 is within two kilometers of location L9, and the location L12 is within two kilometers of at least one of locations "L10" or "L11", the hashtags "#qpr" and "#olympics" may both be identified as tokens associated with the identified location. In some embodiments, in order to suggest a token to a user, the user's consent to use the user's location information is required. For example, the user can consent to using the user's current location to suggest a micropost token. In some embodiments, the user's consent can also be required to use the user's current location to refine the location associated with the micropost token. For example, the user's consent can be required to store the user's current location with the micropost token identifier in log 200. In some embodiments, the user's consent can also be required to store the user's identifier and location with the token identifier in log 200, or to share the user's stored location information with other users who view the micropost.

Method 500 may include providing a suggested token for inclusion with the micropost, as depicted at block 508. In some embodiments, providing a suggested token for inclusion with the micropost may include providing one or more of the identified tokens for use in the micropost. For example, where the hashtags "#qpr" and "#olympics" are identified at block 506, a display of the electronic device may include a field for entering the micropost content along with a user selectable option to include one or both of the hashtags "#qpr" and "#olympics". Thus, a user may simply select one or more of the hashtags to include it within their micropost. In some embodiments, the identified token(s) may be used to provide an auto-complete feature for entering hashtags. For example, where the hashtag "#qpr" is identified at block 506, upon the user entering the symbol "#" in the field for entering the micropost content, the hashtag "#qpr" may be auto-populated into the field such that the user does not have to enter the entirety of the hashtag.

In some embodiments, a thing, such as an event, that is associated with a token may be associated with a location that corresponds to the token. For example, where a soccer match is associated with the hashtag "#qpr" and the location L9 has been identified as corresponding to the hashtag "#qpr", the soccer match may be associated with the location L9. In some embodiments, an index may be updated to reflect the association between the thing and the location. For example, an event-location index (e.g., stored in database 610 of a microblog server 602) may be updated to include an entry that reflects the soccer match being located at location L9. Such an association may be used to identify and provide location information that may not otherwise be available. For example, where the soccer match is an exhibition game that is not publicized and a user generates a map-based search for London, a search sever (e.g., search server 602b) may determine that the soccer match is occurring at location L9 based on an assessment of the event-location index, and serve a search result that includes a map of the London area having a marker for the soccer match being displayed at the location L9 (i.e., the location of Loftus Road Stadium) on the map. Such an event-location index can provide a historical log of the locations of event that are not well publicized.

In some embodiments, a user that provides a token in a micropost is associated with a location that corresponds to the token. For example, where a user submits a micropost that includes the hashtag "#qpr" and the location L9 has been identified as corresponding to the hashtag "#qpr" (e.g., as discussed herein), the user may be associated with the location L9. In some embodiments, user consent is required to associate the user with the location associated with the micropost token. In some embodiments, an index may be updated to reflect the association between the user and the location. For example, a user-location index (e.g., stored in database 610 of a microblog server 602) may be updated to include an entry that reflects the user being located at location L9. Such an association may be used to identify locations which can be used to provide personalized content to users. For example, where a user submits a micropost that includes the hashtag "#qpr" from their electronic device and the user subsequently submits a search query for "hotels" from the electronic device, the search server (e.g., server 602b) may determine that the user is located at location L9 based on an assessment of the user-location index, and may identify and rank a set of search results based on the user's being associated with the location L9. Where L9 is located in London, for example, the search results for hotels in the London area may receive a boost in ranking Although embodiments have been discussed in the context of personalized search results, it will be appreciated that the location information for a user can be used in a variety of context.

Although certain embodiments have been described with regard to logging data in association with particular user identification information for the purposes of illustration, embodiments may incorporate any variety of techniques to protect the identity of users. For example, the name of the author may not be collected, or if collected, may be anonymized to protect the actual identity of the authors. Moreover, the data that is obtained may be subject to a retention policy that responsibly expunges data once it has been used for processing. For example, the micropost may be expunged after a specified timeframe has passed (e.g., two hours), or once the data has been processed and the information of interest has been extracted. In certain embodiments, author or user consent is required to collect information such as location information from the author or user. If the author or user does not provide consent to use their location information, certain functionality describe herein (e.g., personalized search results) may be unavailable to such persons.

Methods 100 and 500 are exemplary embodiments of methods that may be employed in accordance with techniques described herein. Methods 100 and 500 may be modified to facilitate variations of its implementations and uses. The order of the steps of methods 100 and 500 may be changed, and various elements may be added, reordered, combined, omitted, modified, etc. Methods 100 and 500 may be implemented in software, hardware, or a combination thereof. Some or all of methods 100 and 500 may be implemented by one or more of the modules/applications described herein, such as microblog processing module 612*a*, search module 602*b*, and/or applications 608 depicted and described in more detail below with regard to microblog environment 600 of FIG. 6.

Figure 6:
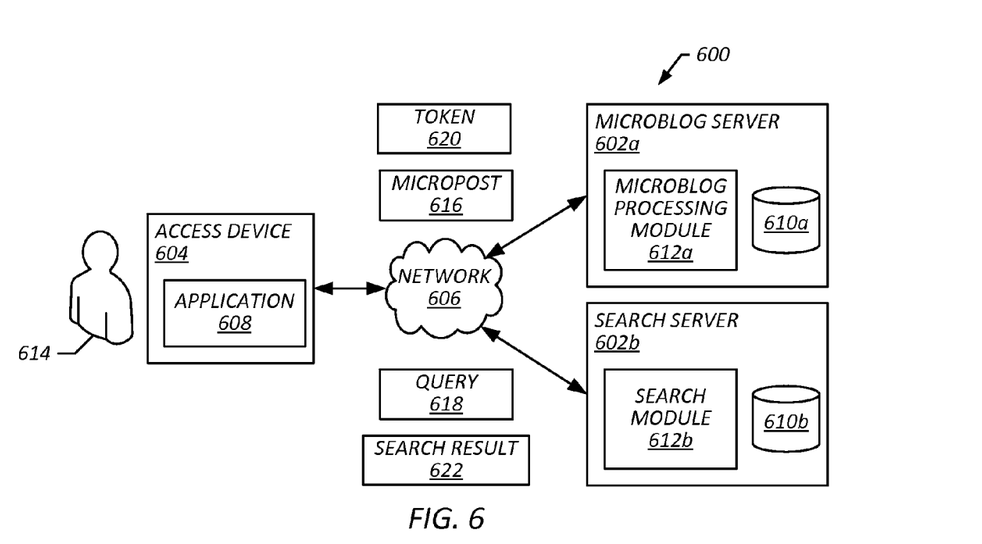
FIG. 6 is a block diagram that illustrates an exemplary microblog environment in accordance with one or more embodiments of the present invention.

FIG. 6 is a block diagram that illustrates an exemplary microblog environment 600 in accordance with one or more embodiments of the present invention. Environment 600 includes a microblog server 602*a*, a search server 602*b*, and an access device 604 communicatively coupled via a network 606.

Network 606 may include an electronic communications network, such as the Internet, a local area network (LAN), a wide area (WAN), a cellular communications network or the like. Network 606 may include a single network or combination of networks.

Access devices 604 may include an electronic device capable of communicating information via network 606. For example, access device 604 may include a personal computer (e.g., a desktop computer), a mobile computing device (e.g., a laptop or tablet computer), a cellular communication device (e.g., a cellular phone), a personal digital assistant (PDA), or the like. In some embodiments, access device 604 is a client of servers 602. In some embodiments, access device 604 include various input/output (I/O) interfaces, such as a graphical user interface (e.g., display screen), an audible output user interface (e.g., speaker), an audible input user interface (e.g., microphone), a keyboard, a pointer/selection device (e.g., mouse, trackball, touchpad, touchscreen, stylus or the like), a printer, or the like. In some embodiments, access device 604 includes general computing components and/or embedded systems optimized with specific components for performing specific tasks. In some embodiments, access device 604 includes a computer system similar to that of computer system 1000 described below with regard to at least FIG. 7.

In some embodiments, access device 604 includes programs/applications 608 that can be used to generate a request for content (e.g., a search query), to provide content (e.g., a micropost), to render content, and/or to send request to and receive request from other devices (e.g., servers 602) via network 606. For example, access device 604 may include an Internet browser application that facilitates communication with servers 602 and/or other entities of environment 600. In some embodiments, applications 608 include modules having program instructions that are executable by a computer system to perform some or all of the functionality described herein with regard to access devices 604.

Servers 602*a* and 602*b* may include network entities that serve requests by client entities, such as requests by access devices 604. Servers 602 may host a content site, such as a website, a file transfer protocol (FTP) site, an Internet search website, a microblog website, or other source of network content. In some embodiments, server 602*a* includes a microblog server. In some embodiments, server 602*b* includes a search server. In some embodiments, servers 602 include or otherwise have access to datastores 610*a* and 610*b*. Datastores 610 may include one or more databases or similar data repositories. In some embodiments, datastore 610*a* includes a repository for storing micropost log 200, micropost subsets (e.g., subset 300), token-location index 400, an event-location index, a user-location index and/or the like. In some embodiments, microblog server 602*a* includes a microblog processing module 612*a*. Module 612*a* may include program instructions that are executable by a computer system to perform some or all of the functionality described herein with regard to microblog server 602*a*. In some embodiments, search server 602*b* includes a search processing module 612*b*. Module 612*b* may include program instructions that are executable by a computer system to perform some or all of the functionality described herein with regard to search server 602*b*. In some embodiments, one or both of servers 602 include a computer system similar to that of computer system 1000 described below with regard to at least FIG. 7. Although servers 602 are each represented by a single box in FIG. 6, servers 602 may each include a single server (or similar system), or a plurality of servers (and/or similar systems). For example, each of servers 602 may include a plurality of different servers (and/or similar systems) that may be employed individually or in combination to perform some or all of the functionality described herein with regard to the respective servers 602.

Figure 7:
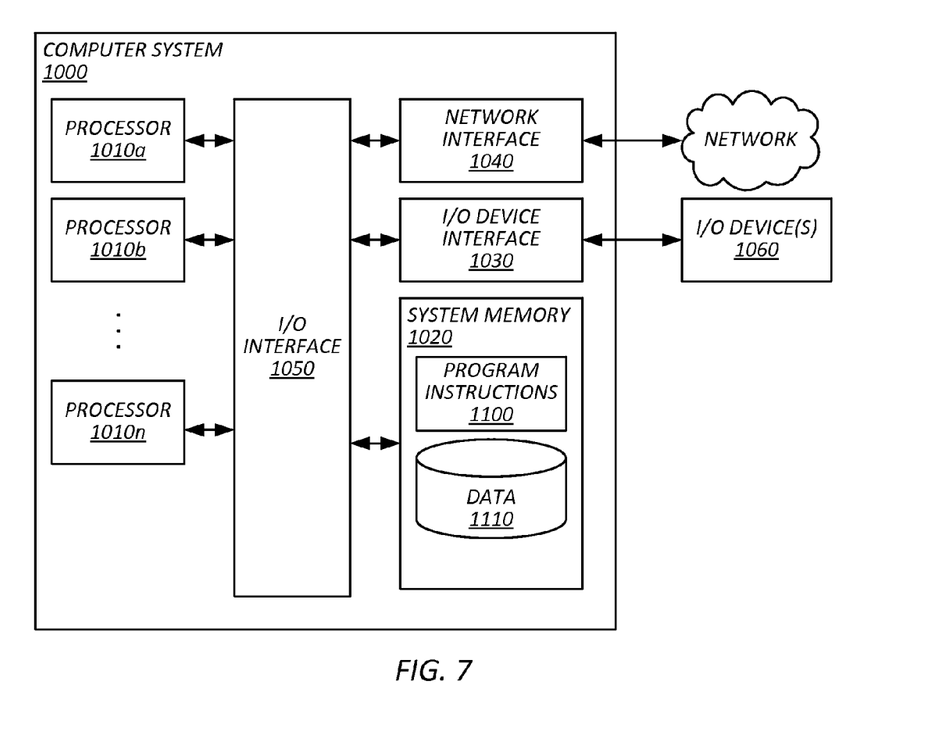
FIG. 7 is a block diagram that illustrates an exemplary computer system in accordance with one or more embodiments of the present invention.

In some embodiments environment 600 is used to employ techniques described herein. For example, one or more users 614 may submit micropost 616 via their respective access devices 604. Server 602*a* may store a log of the microposts (e.g., log 200) in datastore 610*a*. Server 602*a* may assess the log of micropost to identify locations that are associated with tokens. Server 602*a* may update a token-location index (e.g., token-location index 400) stored in datastore 610*a* to reflect the identified associations between tokens and locations. Where a user input relating to generation of a micropost at a given location is received, server 602*a* may assess the token-location index to identify whether a token is associated with the given location and, if a token is identified, provide the token as a suggested token 620 for inclusion in the micropost. Where, for example, a query 618 includes a map-based search for London, search server 602*b* may determine that a soccer match is occurring at location L9 based on an assessment of an event-location index stored in datastore 601*b*, and serve a search result 622 that includes a map of the London area having a marker for the soccer match being displayed at the location L9 (i.e., the location of Loftus Road Stadium) on the map. Where, for example, a user submits a search query 618 for "hotels" from access device 604, search server 602*b* may determine that the user is located at location L9 based on an assessment of the user-location index stored in datastore 601b, and may identify and rank a set of search results 622 based on the user's being associated with the location L9. Where L9 is located in London, for example, the search results for hotels in the London area may receive a boost in ranking Exemplary Computer System FIG. 7 is a block diagram that illustrates an exemplary computer system 1000. Various portions of systems and methods described herein, may include or be executed on one or more computer systems similar to system 1000. For example, server 602a, server 602b and/or access device 604 may include a configuration similar to at least a portion of computer system 1000. Further, methods/processes/modules described herein (e.g., microblog processing module 612a, search processing module 612b, and/or applications 608) may be executed by one or more processing systems similar to that of computer system 1000.

Computer system 1000 may include one or more processors (e.g., processors 1010a-1010n) coupled to system memory 1020, an input/output I/O device interface 1030 and a network interface 1040 via an input/output (I/O) interface 1050. A processor may include a single processor device and/or a plurality of processor devices (e.g., distributed processors). A processor may be any suitable processor capable of executing/performing instructions. A processor may include a central processing unit (CPU) that carries out program instructions to perform the basic arithmetical, logical, and input/output operations of computer system 1000. A processor may include code (e.g., processor firmware, a protocol stack, a database management system, an operating system, or a combination thereof) that creates an execution environment for program instructions. A processor may include a programmable processor. A processor may include general and/or special purpose microprocessors. A processor may receive instructions and data from a memory (e.g., system memory 1020). Computer system 1000 may be a uni-processor system including one processor (e.g., processor 1010a), or a multi-processor system including any number of suitable processors (e.g., 1010a-1010n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

I/O device interface 1030 may provide an interface for connection of one or more I/O devices 1060 to computer system 1000. I/O devices may include any device that provides for receiving input (e.g., from a user) and/or providing output (e.g., to a user). I/O devices 1060 may include, for example, graphical user interface displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 and/or data 1110. Program instructions 1100 may be executable by a processor (e.g., one or more of processors 1010a-1010n) to implement one or more embodiments of the present technique. Instructions 1100 may include modules of computer program instructions for implementing one or more techniques described herein with regard to various processing modules. Program instructions may include a computer program (also known as a program, software, software application, script, or code). A computer program may be written in any form of programming language, including compiled or interpreted languages, or declarative/procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier. A tangible program carrier may include a propagated signal and/or a non-transitory computer readable storage medium. A propagated signal may include an artificially generated signal (e.g., a machine generated electrical, optical, or electromagnetic signal) having encoded information embedded therein. The propagated signal may be transmitted by a suitable transmitter device to and/or received by a suitable receiver device. A non-transitory computer readable storage medium may include a machine readable storage device, a machine readable storage substrate, a memory device, or any combination thereof, or the like. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium having program instructions stored thereon that are executable by a computer processor (e.g., one or more of processors 1010a-1010n) to cause some or all of the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 3020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices and/or software that may perform or otherwise provide for the performance of the techniques described herein. For example, computer system 1000 may include a desktop computer, a laptop computer, a tablet computer, a server device, a client device, a mobile telephone, a personal digital assistant (PDA), a mobile audio or video player, a game console, a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" may include a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method comprising:
   receiving microposts comprising tokens;
   identifying a subset of the microposts that comprise a given token;
   determining a subset geographic location corresponding to the subset of the microposts that comprise the given token, wherein determining the subset geographic location comprises
      identifying microposts associated with geo-tags,
      identifying micropost geographic locations associated with respective ones of the identified microposts based at least in part on the geo-tags, and
      applying a clustering algorithm to the micropost geographic locations to identify the subset geographic location, at least in part by determining that the micropost geographic locations have a cluster density about the subset geographic location;
   associating the given token with the subset geographic location; and
   updating an index to reflect an association between the given token and the subset geographic location.

2. The method of claim 1, wherein the token comprises a hashtag.

3. The method of claim 1, further comprising:
   receiving, from a user, input relating to generation of a micropost;
   identifying a geographic location associated with the user;
   identifying a token associated with the geographic location associated with the user; and providing the token to the user as a suggested token for inclusion with the micropost.

4. The method of claim 1, further comprising:
identifying an event that is associated with the token; and
associating the event with the subset geographic location based at least in part on the event being associated with the token.

5. The method of claim 1, further comprising:
receiving, from a user, a micropost that comprises the token; and
associating the user with the subset geographic location based at least in part on the micropost comprising the token.

6. The method of claim 1, wherein a geo-tag associated with a given micropost comprises a geo-tag that is indicative of a geographic location of an electronic device from which the micropost is generated.

7. The method of claim 1, wherein determining a subset geographic location corresponding to the subset of the microposts comprises determining that the subset of the microposts comprises at least one of the following:
at least a threshold number of microposts that are generated within a given period of time;
at least a threshold number of microposts that are associated with geo-tags; and
at least a threshold number of unique authors.

8. A non-transitory computer readable medium comprising program instructions stored thereon that are executable by a processor to cause the following steps:
receiving microposts comprising tokens;
identifying a subset of the microposts that comprise a given token;
determining a subset geographic location corresponding to the subset of the microposts that comprise the given token, wherein determining the subset geographic location comprises
identifying microposts associated with geo-tags,
identifying micropost geographic locations associated with respective ones of the identified microposts based at least in part on the geo-tags, and
applying a clustering algorithm to the micropost geographic locations to identify the subset geographic location, at least in part by determining that the micropost geographic locations have a cluster density about the subset geographic location;
associating the given token with the subset geographic location; and
updating an index to reflect an association between the given token and the subset geographic location.

9. The non-transitory computer readable medium of claim 8, wherein the token comprises a hashtag.

10. The non-transitory computer readable medium of claim 8, the steps further comprising:
receiving, from a user, input relating to generation of a micropost;
identifying a geographic location associated with the user;
identifying a token associated with the geographic location associated with the user; and
providing the token to the user as a suggested token for inclusion with the micropost.

11. The non-transitory computer readable medium of claim 8, the steps further comprising:
identifying an event that is associated with the token; and
associating the event with the subset geographic location based at least in part on the event being associated with the token.

12. The non-transitory computer readable medium of claim 8, the steps further comprising:
receiving, from a user, a micropost that comprises the token; and
associating the user with the subset geographic location based at least in part on the micropost comprising the token.

13. The non-transitory computer readable medium of claim 8, a geo-tag associated with a given micropost comprises a geo-tag that is indicative of a geographic location of an electronic device from which the micropost is generated.

14. The non-transitory computer readable medium of claim 8, wherein determining a subset geographic location corresponding to the subset of the microposts comprises determining that the subset of the microposts comprise at least one of the following:
at least a threshold number of microposts that are generated within a given period of time;
at least a threshold number of microposts that are associated with geo-tags; and
at least a threshold number of unique authors.

15. A system comprising
one or more memories storing instructions; and
one or more processors coupled to the one or more memories and configured to execute the instructions stored thereon to perform the following steps:
receiving microposts comprising tokens;
identifying a subset of the microposts that comprise a given token;
determining a subset geographic location corresponding to the subset of the microposts that comprise the given token, wherein determining the subset geographic location comprises
identifying microposts associated with geo-tags,
identifying micropost geographic locations associated with respective ones of the identified microposts based at least in part on the geo-tags, and
applying a clustering algorithm to the micropost geographic locations to identify the subset geographic location, at least in part by determining that the micropost geographic locations have a cluster density about the subset geographic location;
associating the given token with the subset geographic location; and
updating an index to reflect an association between the given token and the subset geographic location.

16. The system of claim 15, wherein the token comprises a hashtag.

17. The system of claim 15, the steps further comprising:
receiving, from a user, input relating to generation of a micropost;
identifying a geographic location associated with the user;
identifying a token associated with the geographic location associated with the user; and
providing the token to the user as a suggested token for inclusion with the micropost.

18. The system of claim 15, the steps further comprising:
identifying an event that is associated with the token; and
associating the event with the subset geographic location based at least in part on the event being associated with the token.

19. The system of claim 15, the steps further comprising:
receiving, from a user, a micropost that comprises the token; and
associating the user with the subset geographic location based at least in part on the micropost comprising the token.

20. The system of claim 15, wherein a geo-tag associated with a given micropost comprises a geo-tag that is indicative of a geographic location of an electronic device from which the micropost is generated.

21. The system of claim 15, wherein determining a subset geographic location corresponding to the subset of the microposts comprises determining that the subset of the microposts comprise at least one of the following:
- at least a threshold number of microposts that are generated within a given period of time;
- at least a threshold number of microposts that are associated with geo-tags; and
- at least a threshold number of unique authors.

\* \* \* \* \*